(12) United States Patent  
Jackson

(10) Patent No.: US 7,198,731 B2  
(45) Date of Patent: Apr. 3, 2007

(54) OPTICAL BRIGHTENERS

(75) Inventor: Andrew Clive Jackson, Harrogate (GB)

(73) Assignee: Clariant Finance (BVI) Limited, Tortola (VG)

( * ) Notice: Subject to any disclaimer, the term of this patent is extended or adjusted under 35 U.S.C. 154(b) by 249 days.

(21) Appl. No.: 10/496,190

(22) PCT Filed: Nov. 18, 2002

(86) PCT No.: PCT/IB02/04807

§ 371 (c)(1),  
(2), (4) Date: May 19, 2004

(87) PCT Pub. No.: WO03/044275

PCT Pub. Date: May 30, 2003

(65) Prior Publication Data

US 2005/0022320 A1 Feb. 3, 2005

(30) Foreign Application Priority Data

Nov. 21, 2001 (GB) ................................. 0127903.3

(51) Int. Cl.  
C07D 251/68 (2006.01)  
D21H 21/30 (2006.01)

(52) U.S. Cl. ........................ 252/301.23; 252/301.21; 162/135; 162/162; 544/193.2; 442/130; 8/648; 8/921; 8/924; 8/926; 8/516; 8/517; 8/515; 8/518

(58) Field of Classification Search ........... 252/301.23; 162/135, 162; 544/193.2; 442/130; 8/648, 8/921, 924, 926, 516, 517, 515, 518  
See application file for complete search history.

(56) References Cited

U.S. PATENT DOCUMENTS 2,875,106 A * 2/1959 Adams et al. ............... 427/158

6,025,490 A * 2/2000 Feldhues et al. .......... 544/193.2  
6,121,444 A * 9/2000 Feldhues et al. .......... 544/193.2  
2003/0010459 A1   1/2003 Farrar et al.  
2003/0013628 A1   1/2003 Farrar et al.

FOREIGN PATENT DOCUMENTS

EP 0905317 3/1999  
WO WO 99/42454 * 8/1999  
WO WO 9942454 8/1999

* cited by examiner

*Primary Examiner*—C. Melissa Koslow  
(74) *Attorney, Agent, or Firm*—Tod A. Waldrop

(57) ABSTRACT

The present invention relates to the use of compounds of formula (I)

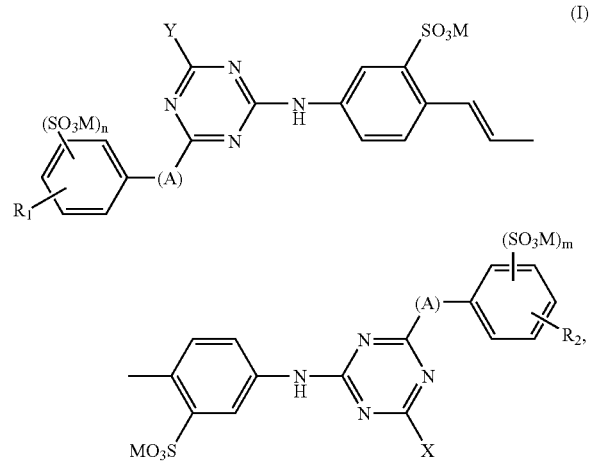

wherein all substituents are as defined in the claims as optical brighteners as well as to new mixtures of optical brighteners.

13 Claims, 6 Drawing Sheets

OPTICAL BRIGHTENERS

The present invention relates to the use of compounds as optical brighteners as well as to new mixtures of optical brighteners.

The whiteness of paper and cardboard articles is an essential technical parameter of the final products. The most important raw materials of the papermaking industry are cellulose, pulp and lignin which naturally absorb blue light and therefore are yellowish in color and impart a dull appearance to the paper. Optical brighteners are used in the papermaking industry to compensate for the absorption of blue light by absorbing UV-light with a maximum wavelength of 350–360 nm and converting it into visible blue light with a maximum wavelength of 440 nm.

Owing to the high efficiency of the optical brightener, the addition of only a small amount can greatly improve the brightness of the paper.

Usually, optical brighteners possess an anionic charge and they behave in many cases like substantive dyestuffs.

For brightening paper either by application to pulp or to the paper surface, the brighteners used are almost exclusively of the triazinylaminostilbene type. While the lightfastness of triazinylaminostilbene brighteners applied to pulp is moderate (approximately 3 on the "Blue Wool Scale"), it is well-known that the lightfastness of these brighteners in coatings is poor (1 to maximum of 1.5 on the "Blue Wool Scale"). (See "Optische Aufheller—neuere Erkenntnisse zu Eigenschaften und Verhalten im Papier" by F. Müller, D. Loewe and B. Hunke in Wochenblatt für Papierfabrikation 1991, 6, pages 191–203.) There is therefore a demand to protect brightened papers, particularly those prepared by applying the brightener in a surface coating, from yellowing in light.

Triazinylaminostilbene brighteners are typically prepared by the following 3-step process

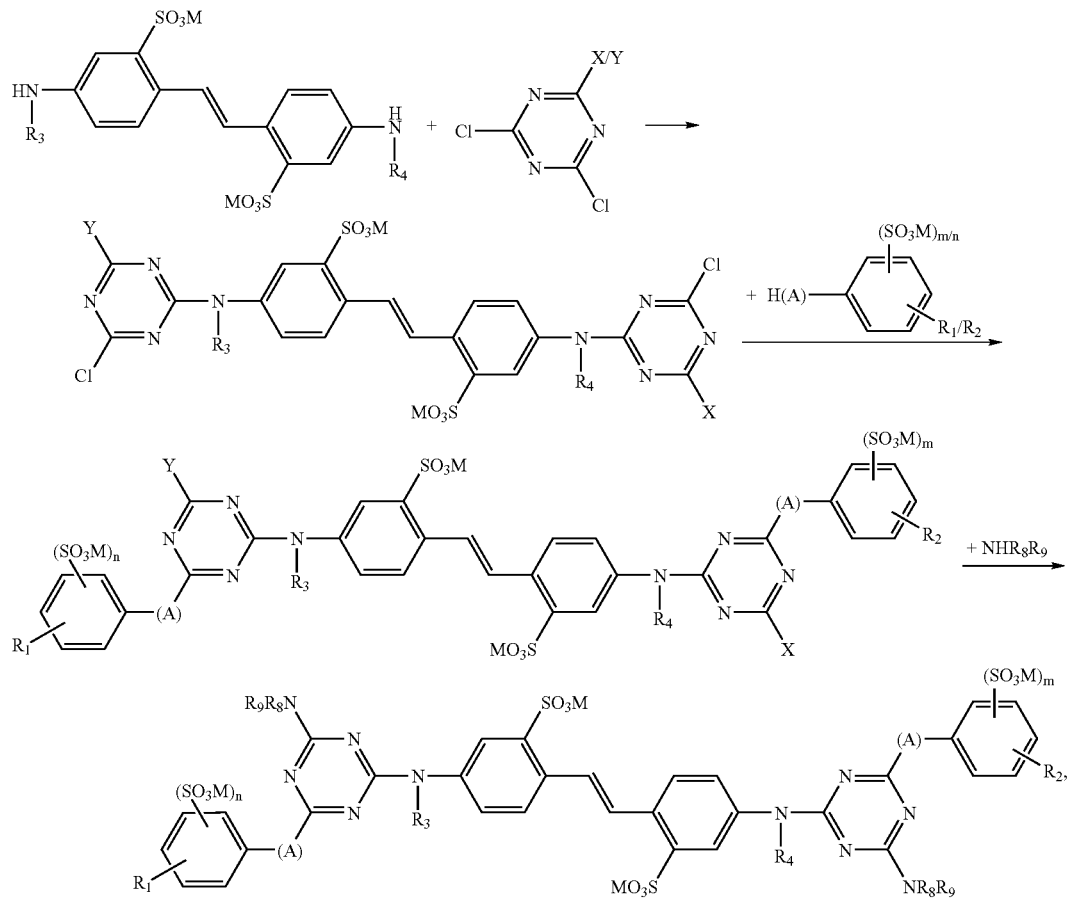

wherein all substituents have the definition as defined below.

Manufacturers have taken great care to ensure that as little halotriazine (especially chlorotriazine) as possible remains in the final product, as the presence of this intermediate is well-known to reduce the ability of the triazinylaminostilbene to brighten paper; typically, the brightener should contain less than 1% little halotriazine (especially chlorotriazine).

Surprisingly, we have now found that the presence of halotriazine (especially chlorotriazine) protects brightened paper against yellowing by light. A possible explanation is that in the presence of light the C—Cl bond is converted to a C—O bond, so-forming a more effective brightener. Thus, at the same time as brightener is being destroyed by light, it is also in effect being replenished by light.

Therefore, the invention relates to the use of a compound of formula (I)

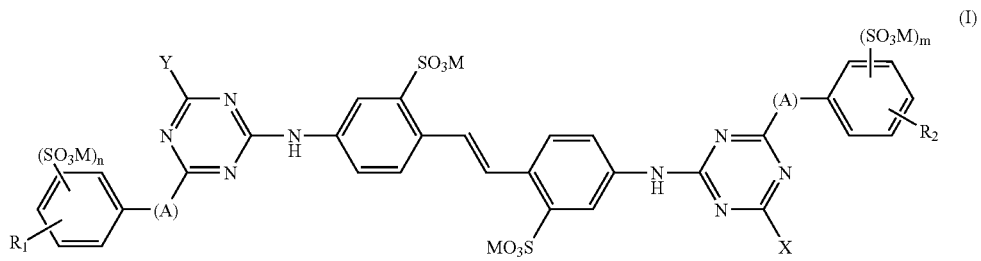

wherein
$R_1$ and $R_2$ signify independently from each other H; halogen; unsubstituted $C_{1-6}$alkyl; substituted $C_{1-6}$alkyl and $C_{1-6}$alkoxy, each (A) signifies independently from each other —O— or —$NR_3$—, wherein
$R_3$ signifies H; unsubstituted $C_{1-4}$alkyl or substituted $C_{1-4}$alkyl, X signifies halogen, preferably F or Cl, more preferably Cl, Y signifies halogen; $OR_4$; $SR_4$ or $NR_4R_5$, wherein
$R_4$ signifies unsubstituted $C_{1-6}$alkyl; substituted $C_{1-6}$alkyl; unsubstituted phenyl or substituted phenyl;
$R_5$ signifies H; unsubstituted $C_{1-6}$alkyl or substituted $C_{1-6}$alkyl, or
$R_4$ and $R_5$ together with the nitrogen atom to which they are bonded form a pyrrolidinyl, piperidinyl or morpholinyl radical, n and m signify independently from each other 0, 1 or 2
each M signify a cation,
as well as mixtures thereof as an optical brightening agent.

The alkyl groups may be linear or branched.

Preferred substituents for the alkyl groups are halogen, —OH, —COOH, —$CONH_2$, $SO_3H$, and —CN.

Preferred substituents for the phenyl groups are $C_{1-4}$alkyl, $C_{1-4}$alkoxy, —$SO_3H$, —COOH, —$SO_2NH_2$ or halogen.

Preferably a compound according to formula (I) wherein
$R_1$ and $R_2$ signify independently from each other H; Cl; F; unsubstituted $C_{1-2}$alkyl; substituted $C_{1-2}$alkyl and $C_{1-2}$alkoxy, each (A) signifies independently from each other —O— or —$NR_3$—, wherein
$R_3$ signifies H; unsubstituted $C_{1-2}$alkyl or substituted $C_{1-2}$alkyl, X signifies F or Cl, Y signifies Cl; F; $OR_4$; $SR_4$ or $NR_4R_5$, wherein
$R_4$ signifies unsubstituted $C_{1-6}$alkyl; substituted $C_{1-6}$alkyl; unsubstituted phenyl or substituted phenyl,
$R_5$ signifies H; unsubstituted $C_{1-6}$alkyl or substituted $C_{1-6}$alkyl, or
$R_4$ and $R_5$ together with the nitrogen atom to which they are bonded form a pyrrolidinyl, piperidinyl or morpholinyl radical, n and m signify independently from each other 0, 1 or 2
each M signify a cation,
as well as mixtures thereof are used.

Suitable cations M are alkali metal, alkaline earth metal, ammonium, alkanolammonium or alkylammonium cations. Examples of cations are the sodium, lithium or ammonium cations or mono-, di- or triethanolammonium cations.

The optical brighteners of formula (I) may be employed in any commercially available form, e.g. as powders or granules, which may be dissolved in water or they may be employed in the form of an aqueous dispersion or an aqueous solution directly from production.

The compounds of formula (I) are suitable for optically brightening natural and regenerated cellulosic fibers, natural and synthetic polyamide and polyurethane fibers, textiles and paper. For the purpose of optical brightening the compounds of formula (I) can be fixed on, or incorporated in, the material. Particularly valuable brightening effects are obtained on paper.

The optical brighteners of formula (I) may be applied to paper either by addition to a paper stock prior to sheet formation or they may be incorporated into a coating composition which is subsequently applied to a paper sheet. Incorporating into a coating composition is particularly effective. Thus the invention also provides a paper coating composition comprising an optical brightener of formula (I) and conventional further coating components, especially fillers and/or pigments and optionally a resin and/or binder and optionally a surfactant, where these conventional components may in particular be employed in concentrations as otherwise usually employed in coating compositions.

The coating composition may be applied to the paper by any conventional means, for example by air-knife, blade, brush, roller, coating bar or at the size-press.

The application of the brightening agent may consist of impregnating the material to be brightened with a solution, especially an aqueous solution, of the compound, whereupon the impregnated material is then dried. It is also possible to treat the material with a product of the invention in the form of a dispersion, for example a dispersion prepared with a dispersant such as a soap, a soaplike substance, a polyglycol ether of a fatty alcohol, sulphite waste liquor, or a condensation product of a naphthalenesulphonic acid (which may be alkylated) with formaldehyde.

A preferred use as optical brightener is characterized in that a mixture of at least one compound of formula (I) as defined above and at least one compound of formula (II)

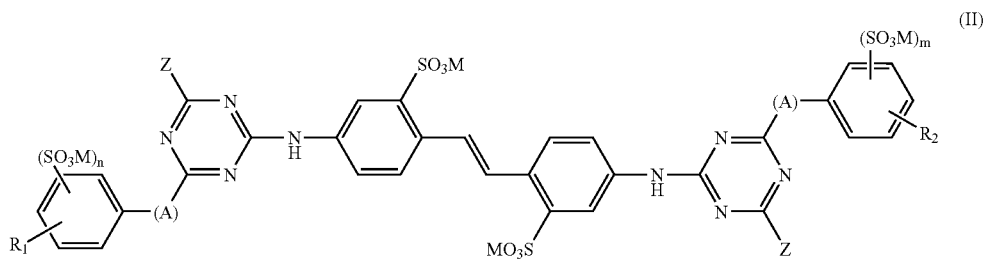

wherein all substituents are as defined above and Z signifies $OR_4$, $SR_4$ or $NR_4R_5$, wherein $R_4$ and $R_5$ have the same meanings as defined above is used.

A mixture of at least one compound of formula (I) and of at least one compound of formula (II) comprises about from 2-wt % to 95-wt % of compound(s) of formula (I), preferably 5-wt % to 80-wt % of compound(s) of formula (I). The wt- % relates to the total amount of optical brighteners.

The paper may also contain other additives known in the art to control brightness reversion. Examples of such additives include ultraviolet absorbers, for example, 2,4-dihydroxybenzo-phenone, benzotriazole UV absorbers such as "Fadex" (trade mark) F liquid and "Tinuvin" (trade mark) 1130, ascorbic acid, sodium ascorbate, ethylene glycol bisthioglycolate, S-methyl-1-thioglycerol, sodium hypophosphite, poly(ethylene glycol), and poly(tetrahydrofuran).

The paper may further contain other additives commonly employed in the papermaking industry. Examples of such additives include sizing agents (for example, rosin, starch, alkyl ketene dimer, alkenyl succinic anhydride), wet strength resins (for example, poly-aminoamide-epichlorohydrin resins), retention- and drainage aids (for example, poly-aluminium chloride, polydiallyidimethylammonium chloride), and optical brightening agents.

The following examples further serve to illustrate the invention. In the Examples all parts and all percentages are by weight, and the temperatures given are in degrees Celsius, unless indicated to the contrary.

EXAMPLE 1

Figure 1:
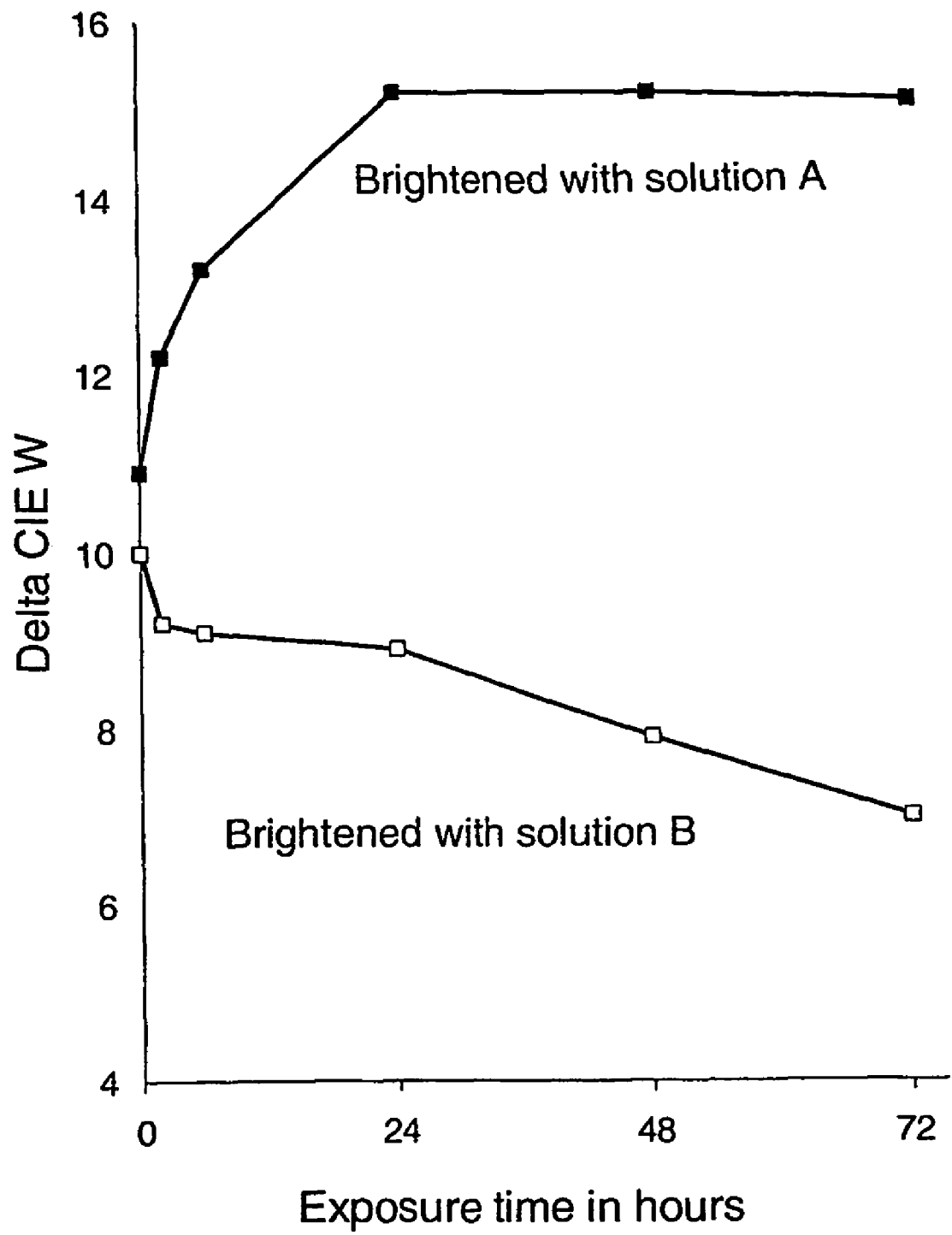
FIGS. 1–6 show the results of the accelerated agemg test discussed in examples 1–6 and tables 1–6.

A solution of 21.3 parts aniline-2,5-disulphonic acid and 6.7 parts sodium hydroxide in 30 parts water is added to a stirred suspension of 15.5 parts cyanuric chloride in 50 parts ice water. The pH is kept at 6 by the dropwise addition of 30% sodium hydroxide. The mixture is stirred below 10° C. until primary aromatic amine groups can no longer be detected by the diazo reaction. A solution of 14.8 parts 4,4'-diaminostilbene-2,2'-di-sulphonic acid and 3.2 parts sodium hydroxide in 20 parts water is then added, the pH is adjusted to between 6.5 and 7.5 by the addition of 30% sodium hydroxide and the mixture is stirred at 30° C. until a negative diazo reaction is obtained. A solution of 5.3 parts L-aspartic acid in 10 parts 16% sodium hydroxide is added, and the mixture is heated at reflux for 6 hours, the pH being kept at 7.5 to 8.5 by the addition of sodium carbonate. The solution is diluted to 320 parts with water to give a clear solution (SOLUTION A) containing the compounds of formula (IIIa), (IIIb) and (IIIc)

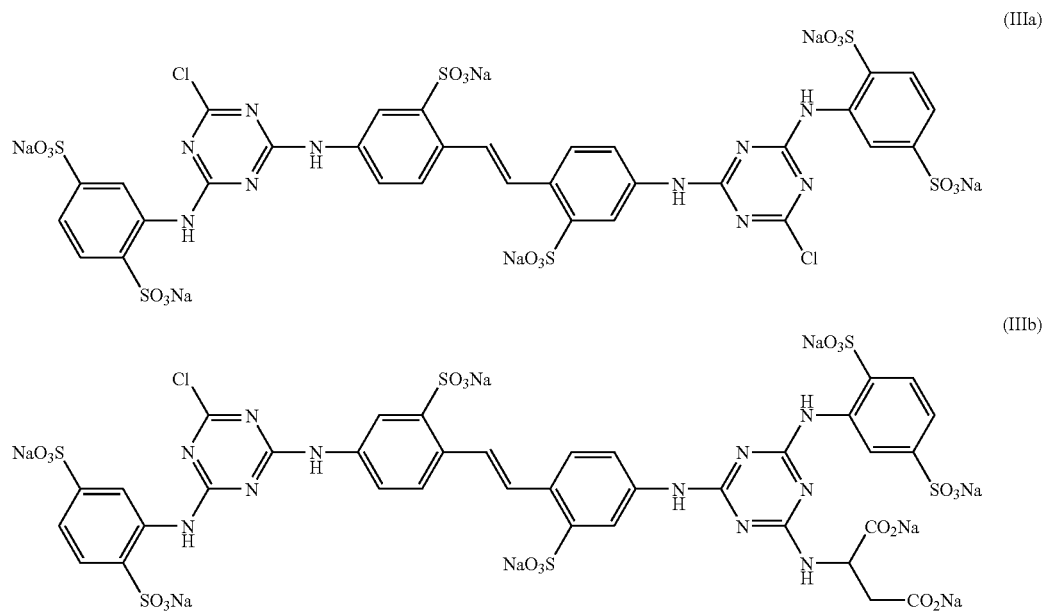

-continued

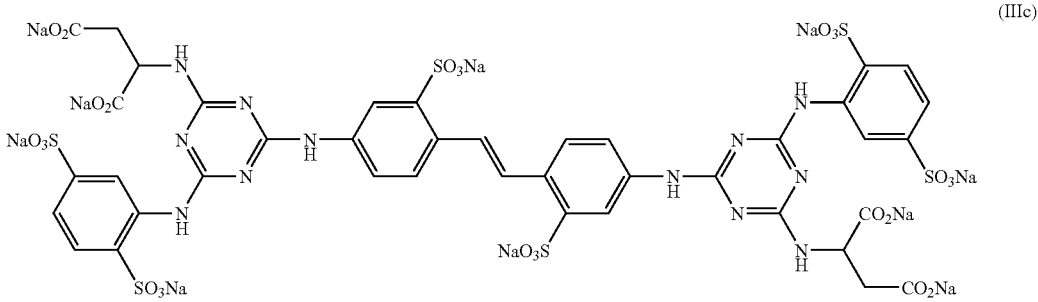

in a molar ratio of 20/40/40.

EXAMPLE 2

A solution of 66.5 parts aniline-2,5-disulphonic acid and 21 parts sodium hydroxide in 100 parts water is added to a stirred suspension of 48.4 parts cyanuric chloride in 150 parts ice water. The pH is kept at 6 by the dropwise addition of 30% sodium hydroxide. The mixture is stirred below 10° C. until primary aromatic amine groups can no longer be detected by the diazo reaction. A solution of 46.3 parts 4,4'-diaminostilbene-2,2'-disulphonic acid and 10.0 parts sodium hydroxide in 62.5 parts water is then added, the pH is adjusted to between 6.5 and 7.5 by the addition of 30% sodium hydroxide and the mixture is stirred at 30° C. until a negative diazo reaction is obtained. The stirred mixture is then treated with 80.0 parts methanol and heated to reflux for 2.5 hours, maintaining a pH of 8 by the dropwise addition of 30% sodium hydroxide. After cooling, the precipitate is collected by filtration, washed with methanol and dissolved in water to give 320 parts of a clear solution (SOLUTION C) containing the compounds of formula (IVa), (IVb) and (IVc)

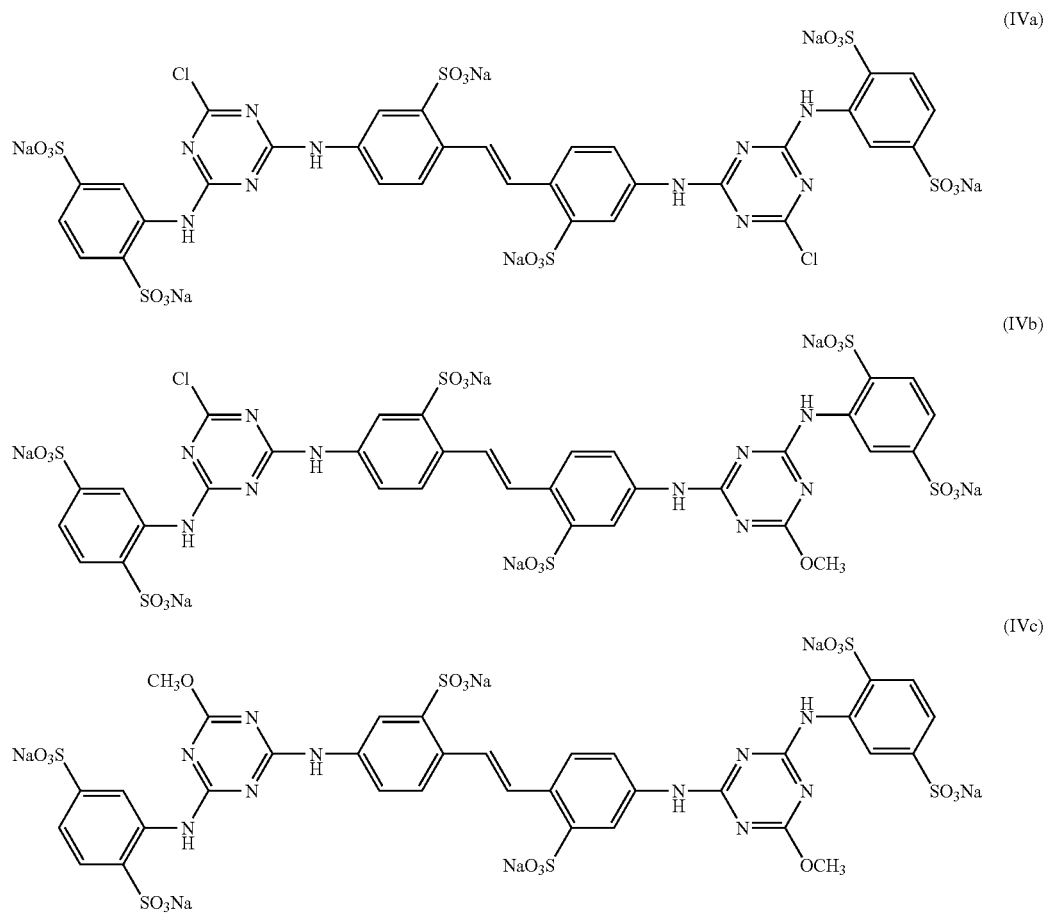

in a molar ratio of 20/50/30.

EXAMPLE 3

A solution of 14.8 parts 4,4'-diaminostilbene-2,2'-disulphonic acid and 3.2 parts sodium hydroxide in 74 parts water is added dropwise over 1 hour to a solution of 14.8 parts cyanuric chloride in 125 parts acetone stirred with 60 parts ice. Once the addition is complete, the pH is adjusted to 6–7 by the addition of sodium carbonate. The stirred mixture is allowed to warm to room temperature and is kept at pH 6–7 until primary aromatic amine groups can no longer be detected by the diazo reaction. 7.5 parts of aniline are then added, and the mixture is stirred at 40° C. and pH 6–7 until a negative diazo reaction is obtained. The stirred mixture is then treated with 4.2 parts diethanolamine, and the acetone is removed by distillation. The reaction is completed by heating to 78–82° C. for 1 hour at a pH of 8. The precipitated product is isolated and re-dissolved at pH 8 (sodium hydroxide) in an aqueous solution of 32 parts urea in water to give 190 parts of a clear solution (SOLUTION D) containing the compounds (Va), (Vb) and (Vc)

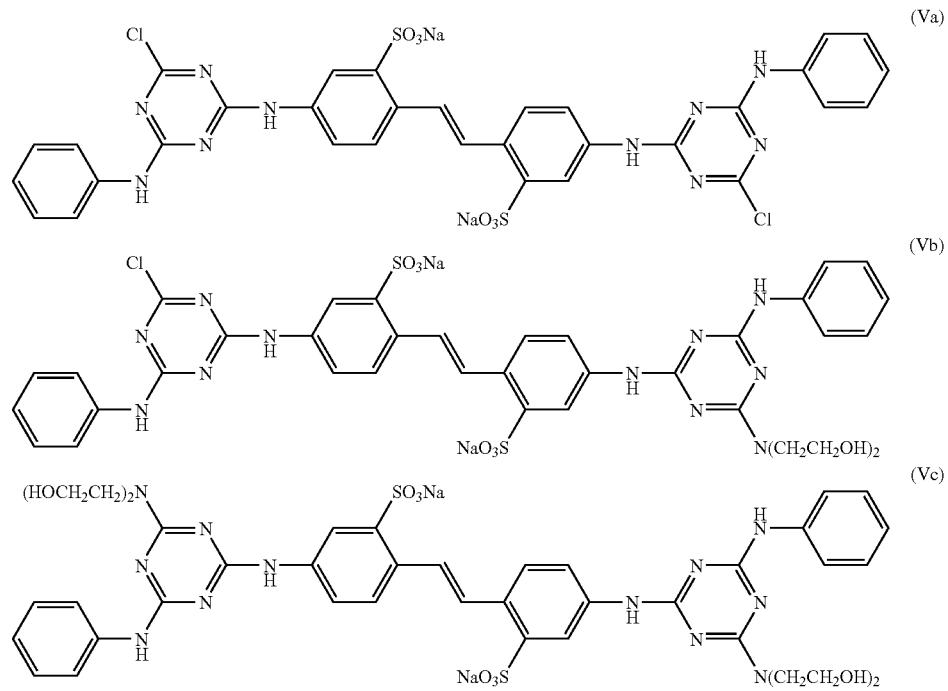

in a molar ration of 25/50/25.

EXAMPLE 4

A solution of 53.2 parts aniline-2,5-disulphonic acid and 16.8 parts sodium hydroxide in 75 parts water is added to a stirred suspension of 38.7 parts cyanuric chloride in 125 parts ice water. The pH is kept at 6 by the dropwise addition of 30% sodium hydroxide. The mixture is stirred below 10° C. until primary aromatic amine groups can no longer be detected by the diazo reaction. A solution of 37.0 parts 4,4'-diaminostilbene-2,2'-di-sulphonic acid and 8.0 parts sodium hydroxide in 50 parts water is then added, the pH is adjusted to between 6.5 and 7.5 by the addition of 30% sodium hydroxide and the mixture is stirred at 30° C. until a negative diazo reaction is obtained. The product is 457 parts of an aqueous suspension containing 27% by weight of a compound according to formula

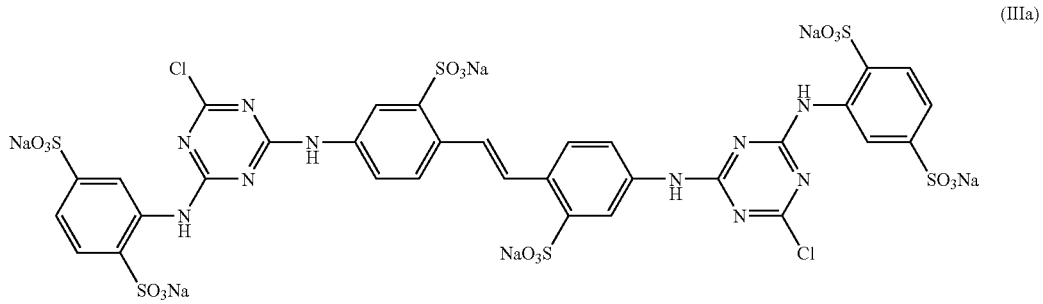

To 274.2 parts of the aqueous suspension of a compound according to formula (IIIa) is added a solution of 17.6 parts L-aspartic acid in 33 parts 16% sodium hydroxide. The mixture is then heated at reflux for 2 hours, the pH being kept at 7.5 to 8.5 by the addition of 30% sodium hydroxide. The solution of a compound of formula (IIIc)

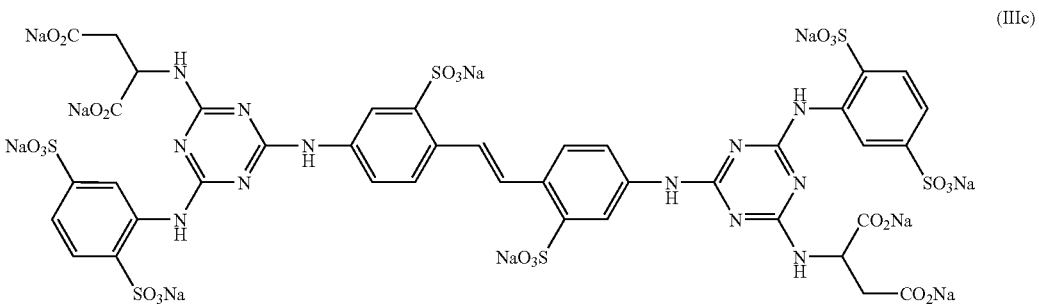

so-formed is cooled to 40–50° C. and treated with the remaining 182.8 parts of the aqueous suspension of the compound of formula (IIIa). The resulting solution is adjusted to a pH of 8–9 and diluted to 800 parts with water to give a clear, storage-stable solution (SOLUTION F) containing compounds of formula (IIIa) and of formula (IIIc) in a molar ratio of 40/60.

TABLE 1

Examples 5–29
Preferred structures are Ia and Ib (for application to stock or by coating) and Ic (for application by coating).

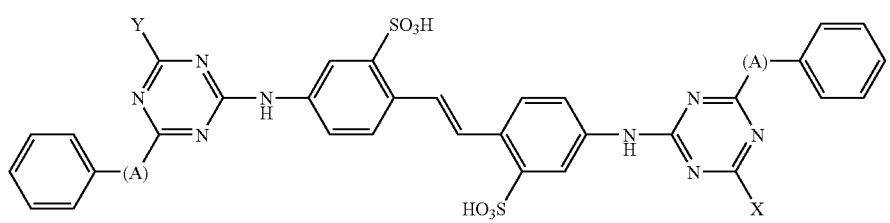

| Exp. | (A) | X | Y |
|---|---|---|---|
| 5 | —NH— | —Cl | —NHCH$_2$CH$_2$OH |
| 6 | —NH— | —Cl | —NHCH$_2$CH$_2$SO$_3$H |
| 7 | —NH— | —Cl | —N(CH$_3$)CH$_2$CH$_2$OH |
| 8 | —NH— | —Cl | —N(CH$_3$)CH$_2$CH$_2$SO$_3$H |
| 9 | —NH— | —Cl | —NHCH$_2$CH(CH$_3$)OH |
| 10 | —NH— | —Cl | —NHCH(CO$_2$H)CH$_2$CO$_2$H |
| 11 | —NH— | —Cl | —N(morpholino) |
| 12 | —NH— | —Cl | —N(CH$_2$CH$_2$OH)$_2$ |
| 13 | —NH— | —Cl | —NHCH(CO$_2$H)CH$_2$CH$_2$CO$_2$H |
| 15 | —NH— | —Cl | —N(CH$_2$CH$_2$OH)CH$_2$CH$_2$CONH$_2$ |
| 16 | —NH— | —Cl | —N(CH$_2$CH(CH$_3$)OH)CH$_2$CH$_2$CN |
| 17 | —NH— | —Cl | —N(CH$_2$CH(CH$_3$)OH)$_2$ |
| 18 | —NH— | —Cl | —NHC$_6$H$_5$ |
| 19 | —NH— | —Cl | —OCH$_3$ |
| 20 | —NH— | —Cl | —OCH$_2$CH$_2$OH |
| 21 | —NH— | —Cl | —OCH$_2$CH(CH$_3$)OH |
| 22 | —NH— | —Cl | —OCH$_2$CH$_2$OCH$_2$CH$_2$OH |
| 23 | —NH— | —Cl | —SCH$_2$CH(OH)CH$_2$OH |
| 24 | —O— | —Cl | —Cl |
| 25 | —O— | —Cl | —N(CH$_2$CH$_2$OH)$_2$ |
| 26 | —O— | —Cl | —N(CH$_2$CH$_2$OH)CH$_2$CH$_2$CONH$_2$ |

TABLE 1-continued

Examples 5–29
Preferred structures are Ia and Ib (for application to stock or by coating) and Ic (for application by coating).

(Ia)

| Exp. | (A) | X | Y |
|------|-----|---|---|
| 27 | —NH— | —F | —F |
| 28 | —NH— | —F | —N(CH$_2$CH$_2$OH)$_2$ |
| 29 | —NH— | —F | —N(CH$_2$CH$_2$OH)CH$_2$CH$_2$CONH$_2$ |

TABLE 2

Examples 30–58

(Ib)

| Exp. | (A) | X | Y | Posn. of —SO$_3$H |
|------|-----|---|---|------------------|
| 30 | —NH— | —Cl | —Cl | 2 |
| 31 | —NH— | —Cl | —Cl | 3 |
| 32 | NH | —Cl | —N(CH$_2$CH$_2$OH)$_2$ | 3 |
| 33 | —NH— | —Cl | —NHCH(CO$_2$H)CH$_2$CO$_2$H | 3 |
| 34 | —NH— | —Cl | —Cl | 4 |
| 35 | —NH— | —Cl | —NHCH$_2$CH$_2$OH | 4 |
| 36 | —NH— | —Cl | —NHCH$_2$CH$_2$SO$_3$H | 4 |
| 37 | —NH— | —Cl | —N(CH$_3$)CH$_2$CH$_2$OH | 4 |
| 38 | —NH— | —Cl | —N(CH$_3$)CH$_2$CH$_2$SO$_3$H | 4 |
| 39 | —NH— | —Cl | —NHCH$_2$CH(CH$_3$)OH | 4 |
| 40 | —NH— | —Cl | —N(CH$_2$CO$_2$H)$_2$ | 4 |
| 41 | —NH— | —Cl | —NHCH(CO$_2$H)CH$_2$CO$_2$H | 4 |
| 42 | —NH— | —Cl | —N(morpholino) | 4 |
| 43 | —NH— | —Cl | —N(CH$_2$CH$_2$OH)$_2$ | 4 |
| 44 | —NH— | —Cl | —NHCH(CO$_2$H)CH$_2$CH$_2$CO$_2$H | 4 |
| 45 | —NH— | —Cl | —N(CH$_2$CH$_2$OH)CH$_2$CH$_2$CN | 4 |
| 46 | —NH— | —Cl | —N(CH$_2$CH$_2$OH)CH$_2$CH$_2$CONH$_2$ | 4 |
| 47 | —NH— | —Cl | —N(CH$_2$CH(CH$_3$)OH)CH$_2$CH$_2$CN | 4 |
| 48 | —NH— | —Cl | —N(CH$_2$CH(CH$_3$)OH)$_2$ | 4 |
| 49 | —NH— | —Cl | —NHC$_6$H$_5$ | 4 |
| 50 | —NH— | —Cl | —OCH$_3$ | 4 |
| 51 | —NH— | —Cl | —OC$_6$H$_5$ | 4 |
| 52 | —NH— | —Cl | —SCH$_2$CH(OH)CH$_2$OH | 4 |
| 53 | —O— | —Cl | —Cl | 4 |
| 54 | —O— | —Cl | —N(CH$_2$CH$_2$OH)$_2$ | 4 |
| 55 | —O— | —Cl | —NHCH(CO$_2$H)CH$_2$CO$_2$H | 4 |
| 56 | —NH— | —F | —F | 4 |

TABLE 2-continued

Examples 30–58

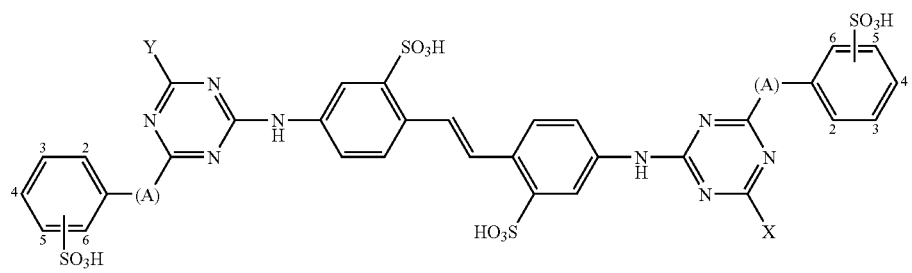
(Ib)

| Exp. | (A) | X | Y | Posn. of —SO$_3$H |
|---|---|---|---|---|
| 57 | —NH— | —F | —N(CH$_2$CH$_2$OH)$_2$ | 4 |
| 58 | —NH— | —F | —NHCH(CO$_2$H)CH$_2$CO$_2$H | 4 |

TABLE 3

Examples 59–77

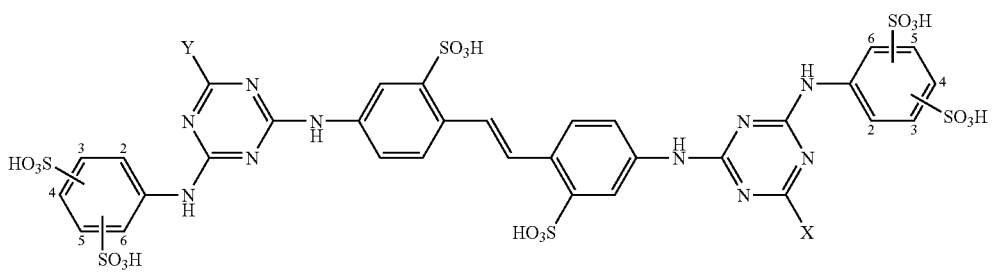
(Ic)

| Exp. | X | Y | Posn. of —SO$_3$H |
|---|---|---|---|
| 59 | —Cl | —Cl | 2,4 |
| 60 | —Cl | —N(CH$_2$CH$_2$OH)$_2$ | 2,4 |
| 61 | —Cl | —NHCH$_2$CH$_2$SO$_3$H | 2,5 |
| 62 | —Cl | —N(CH$_3$)CH$_2$CH$_2$SO$_3$H | 2,5 |
| 63 | —Cl | —NHCH$_2$CH(OH)CH$_2$NH$_2$ | 2,5 |
| 64 | —Cl | —N(CH$_2$CO$_2$H)$_2$ | 2,5 |
| 65 | —Cl | —N(morpholino) | 2,5 |
| 66 | —Cl | —N(CH$_2$CH$_2$OH)$_2$ | 2,5 |
| 67 | —Cl | —N(CH$_2$CH$_2$OH)CH$_2$CH$_2$NH$_2$ | 2,5 |
| 68 | —Cl | —NHCH(CO$_2$H)CH$_2$CH$_2$CO$_2$H | 2,5 |
| 69 | —Cl | —N(CH$_2$CH$_2$OH)CH$_2$CH$_2$CONH$_2$ | 2,5 |
| 70 | —Cl | —N(CH$_2$CH(CH$_3$)OH)CH$_2$CH$_2$CN | 2,5 |
| 71 | —Cl | —N(CH$_2$CH(CH$_3$)OH)$_2$ | 2,5 |
| 72 | —Cl | —N(CH$_2$C$_6$H$_5$)CH$_2$CH$_2$CN | 2,5 |
| 73 | —Cl | —N(CH$_2$C$_6$H$_5$)CH$_2$CH$_2$CONH$_2$ | 2,5 |
| 74 | —Cl | —OC$_6$H$_5$ | 2,5 |
| 75 | —Cl | —SCH$_2$CH(OH)CH$_2$OH | 2,5 |
| 76 | —F | —F | 2,5 |
| 77 | —F | —N(CH$_2$CH$_2$OH)$_2$ | 2,5 |

TABLE 4

Examples 78–97

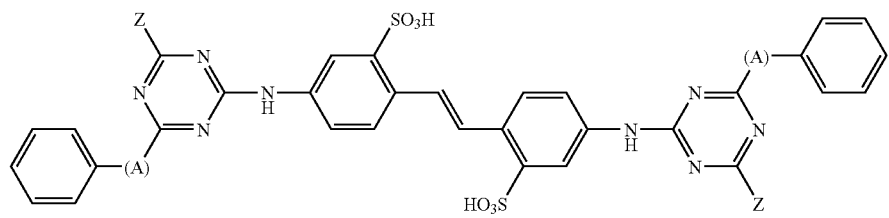

(Id)

| Exp. | (A) | Z |
|---|---|---|
| 78 | —NH— | —NHCH$_2$CH$_2$OH |
| 79 | —NH— | —NHCH$_2$CH$_2$SO$_3$H |
| 80 | —NH— | —N(CH$_3$)CH$_2$CH$_2$OH |
| 81 | —NH— | —N(CH$_3$)CH$_2$CH$_2$SO$_3$H |
| 82 | —NH— | —NHCH$_2$CH(CH$_3$)OH |
| 83 | —NH— | —N(CH$_2$CO$_2$H)$_2$ |
| 84 | —NH— | —NHCH(CO$_2$H)CH$_2$CO$_2$H |
| 85 | —NH— | ![morpholine] |
| 86 | —NH— | —NHCH(CO$_2$H)CH$_2$CH$_2$CO$_2$H |
| 87 | —NH— | —N(CH$_2$CH$_2$OH)CH$_2$CH$_2$CONH$_2$ |
| 88 | —NH— | —N(CH$_2$CH(CH$_3$)OH)CH$_2$CH$_2$CN |
| 89 | —NH— | —N(CH$_2$CH(CH$_3$)OH)$_2$ |
| 90 | —NH— | —NHC$_6$H$_5$ |
| 91 | —NH— | —OCH$_3$ |
| 92 | —NH— | —OCH$_2$CH$_2$OH |
| 93 | —NH— | —OCH$_2$CH(CH$_3$)OH |
| 94 | —NH— | —OCH$_2$CH$_2$OCH$_2$CH$_2$OH |
| 95 | —NH— | —SCH$_2$CH(OH)CH$_2$OH |
| 96 | —O— | —N(CH$_2$CH$_2$OH)$_2$ |

TABLE 5

Examples 98–119

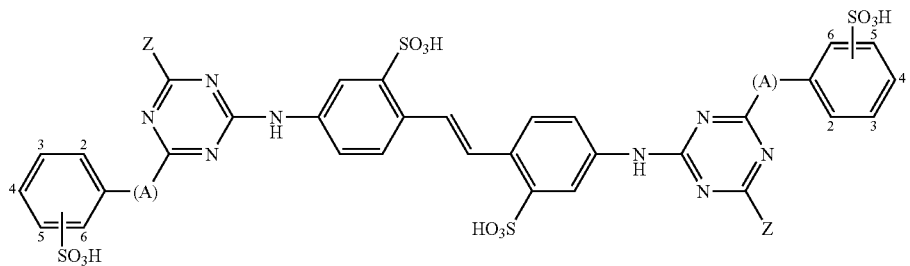

(Ie)

| Exp. | (A) | Z | Posn. of —SO$_3$H |
|---|---|---|---|
| 98 | —NH— | —N(CH$_2$CH$_2$OH)$_2$ | 3 |
| 99 | —NH— | —NHCH(CO$_2$H)CH$_2$CO$_2$H | 3 |
| 100 | —NH— | —NHCH$_2$CH$_2$OH | 4 |
| 101 | —NH— | —NHCH$_2$CH$_2$SO$_3$H | 4 |
| 102 | —NH— | —N(CH$_3$)CH$_2$CH$_2$OH | 4 |
| 103 | —NH— | —N(CH$_3$)CH$_2$CH$_2$SO$_3$H | 4 |
| 104 | —NH— | —NHCH$_2$CH(CH$_3$)OH | 4 |
| 105 | —NH— | —N(CH$_2$CO$_2$H)$_2$ | 4 |
| 106 | —NH— | —NHCH(CO$_2$H)CH$_2$CO$_2$H | 4 |

TABLE 5-continued

Examples 98–119

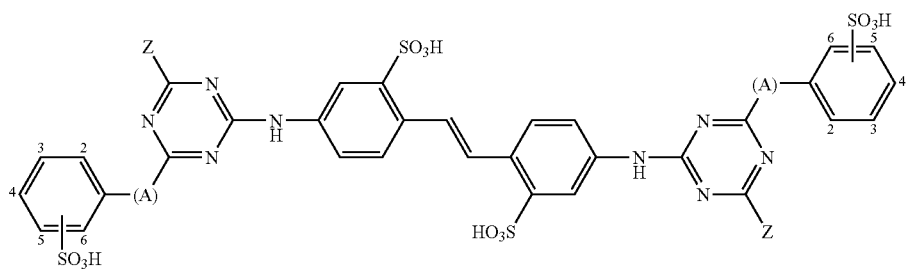

(Ie)

| Exp. | (A) | Z | Posn. of —SO₃H |
|---|---|---|---|
| 107 | —NH— | ![morpholine]—N(morpholine) | 4 |
| 108 | —NH— | —N(CH₂CH₂OH)₂ | 4 |
| 109 | —NH— | —NHCH(CO₂H)CH₂CH₂CO₂H | 4 |
| 110 | —NH— | —N(CH₂CH₂OH)CH₂CH₂CN | 4 |
| 111 | —NH— | —N(CH₂CH₂OH)CH₂CH₂CONH₂ | 4 |
| 112 | —NH— | —N(CH₂CH(CH₃)OH)CH₂CH₂CN | 4 |
| 113 | —NH— | —N(CH₂CH(CH₃)OH)₂ | 4 |
| 114 | —NH— | —NHC₆H₅ | 4 |
| 115 | —NH— | —OCH₃ | 4 |
| 116 | —NH— | —OC₆H₅ | 4 |
| 117 | —NH— | —SCH₂CH(OH)CH₂OH | 4 |
| 118 | —O— | —N(CH₂CH₂OH)₂ | 4 |
| 119 | —O— | —NHCH(CO₂H)CH₂CO₂H | 4 |

TABLE 6

Examples 120–135

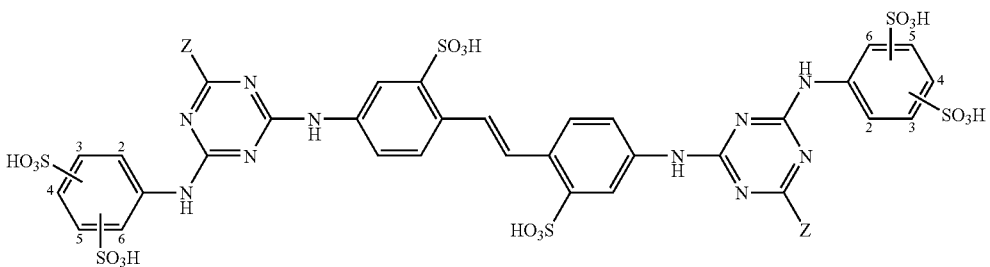

(Ie)

| Exp. | Z | Posn. of —SO₃H |
|---|---|---|
| 120 | —N(CH₂CH₂OH)₂ | 2,4 |
| 121 | —NHCH₂CH₂SO₃H | 2,5 |
| 122 | —N(CH₃)CH₂CH₂SO₃H | 2,5 |
| 123 | —NHCH₂CH(OH)CH₂NH₂ | 2,5 |
| 124 | —N(CH₂CO₂H)₂ | 2,5 |
| 125 | —N(morpholine) | 2,5 |
| 126 | —N(CH₂CH₂OH)₂ | 2,5 |
| 127 | —N(CH₂CH₂OH)CH₂CH₂NH₂ | 2,5 |
| 128 | —NHCH(CO₂H)CH₂CH₂CO₂H | 2,5 |
| 129 | —N(CH₂CH₂OH)CH₂CH₂CONH₂ | 2,5 |
| 130 | —N(CH₂CH(CH₃)OH)CH₂CH₂CN | 2,5 |
| 131 | —N(CH₂CH(CH₃)OH)₂ | 2,5 |

TABLE 6-continued

Examples 120–135

(Ie)

[Chemical structure of formula (Ie): a stilbene-bis-triazine compound with Z substituents, NH linkages, and SO₃H groups at various positions on pendant phenyl and central phenyl rings]

| Exp. | Z | Posn. of —SO₃H |
|---|---|---|
| 132 | —N(CH₂C₆H₅)CH₂CH₂CN | 2,5 |
| 133 | —N(CH₂C₆H₅)CH₂CH₂CONH₂ | 2,5 |
| 134 | —OC₆H₅ | 2,5 |
| 135 | —SCH₂CH(OH)CH₂OH | 2,5 |

APPLICATION EXAMPLE 1

A coating composition is prepared containing 500 parts chalk (commercially available under the trade name Hydrocarb® 90 from OMYA), 500 parts clay (commercially available under the trade name Kaolin® SPS from IMERYS), 494 parts water, 6 parts dispersing agent (a sodium salt of a polyacrylic acid commercially available under the trade name Polysalz S from BASF), 200 parts latex (an acrylic ester copolymer commercially available under the trade name Acronal® S320D from BASF) and 400 parts of a 20% solution of starch (commercially available under the trade name Perfectamyl® A4692 from Avebe) in water. The solids content is adjusted to 66.7% by the addition of water, and the pH is adjusted to 8–9 with sodium hydroxide.

SOLUTION A from Example 1 is added at a concentration of 1.5% to the stirred coating composition. The brightened coating composition is then applied to a commercial 75 gm$^{-2}$ neutral-sized white paper base sheet using an automatic wire-wound bar applicator with a standard speed setting and a standard load on the bar. The coated paper is then dried for 5 minutes in a hot air flow. The dried paper is allowed to condition, the measured for CIE Whiteness on a calibrated ELREPHO® (Trademark of Datacolor) spectrophotometer. For comparative purposes, a coated paper is prepared to approximately the same level of CIE whiteness using an aqueous SOLUTION B containing only brightener of formula (IIIc).

Accelerated ageing experiments are conducted by exposing the papers to direct sunlight. CIE whiteness measurements are made at regular intervals. The results are shown below in tabular (Table 1) and graphical (FIG. 1) forms.

TABLE 1

| | Time (h) | CIE W[1] | Delta CIE W[2] |
|---|---|---|---|
| Unbrightened base paper | 0 | 94.0 | — |
| | 2 | 88.7 | — |
| | 6 | 88.3 | — |
| | 24 | 86.5 | — |
| | 48 | 83.2 | — |
| | 72 | 78.5 | — |

TABLE 1-continued

| | Time (h) | CIE W[1] | Delta CIE W[2] |
|---|---|---|---|
| Brightened with SOLUTION B | 0 | 104.0 | 10.0 |
| | 2 | 97.9 | 9.2 |
| | 6 | 97.4 | 9.1 |
| | 24 | 95.4 | 8.9 |
| | 48 | 91.1 | 7.9 |
| | 72 | 85.5 | 7.0 |
| Brightened with SOLUTION A | 0 | 104.9 | 10.9 |
| | 2 | 100.9 | 12.2 |
| | 6 | 101.5 | 13.2 |
| | 24 | 101.7 | 15.2 |
| | 48 | 98.4 | 15.2 |
| | 72 | 93.6 | 15.1 |

[1]CIE W is CIE Whiteness;
[2]Delta CIE W is the difference between the CIE Whiteness of the brightened paper and that of the unbrightened paper at the time stated.

APPLICATION EXAMPLE 2

A coating composition is prepared as described in Application Example 1. SOLUTION C from Example 2 is added at a concentration of 2.0% to the stirred coating composition. The brightened coating composition is then applied to a commercial 75 gm$^{-2}$ neutral-sized white paper base sheet using an automatic wire-wound bar applicator with a standard speed setting and a standard load on the bar. The coated paper is then dried for 5 minutes in a hot air flow. The dried paper is allowed to condition, then measured for CIE Whiteness on a calibrated ELREPHO® spectrophotometer. For comparative purposes, a coated paper is prepared to approximately the same level of CIE whiteness using an aqueous SOLUTION B containing only brightener of formula (IIIc).

Figure 2:
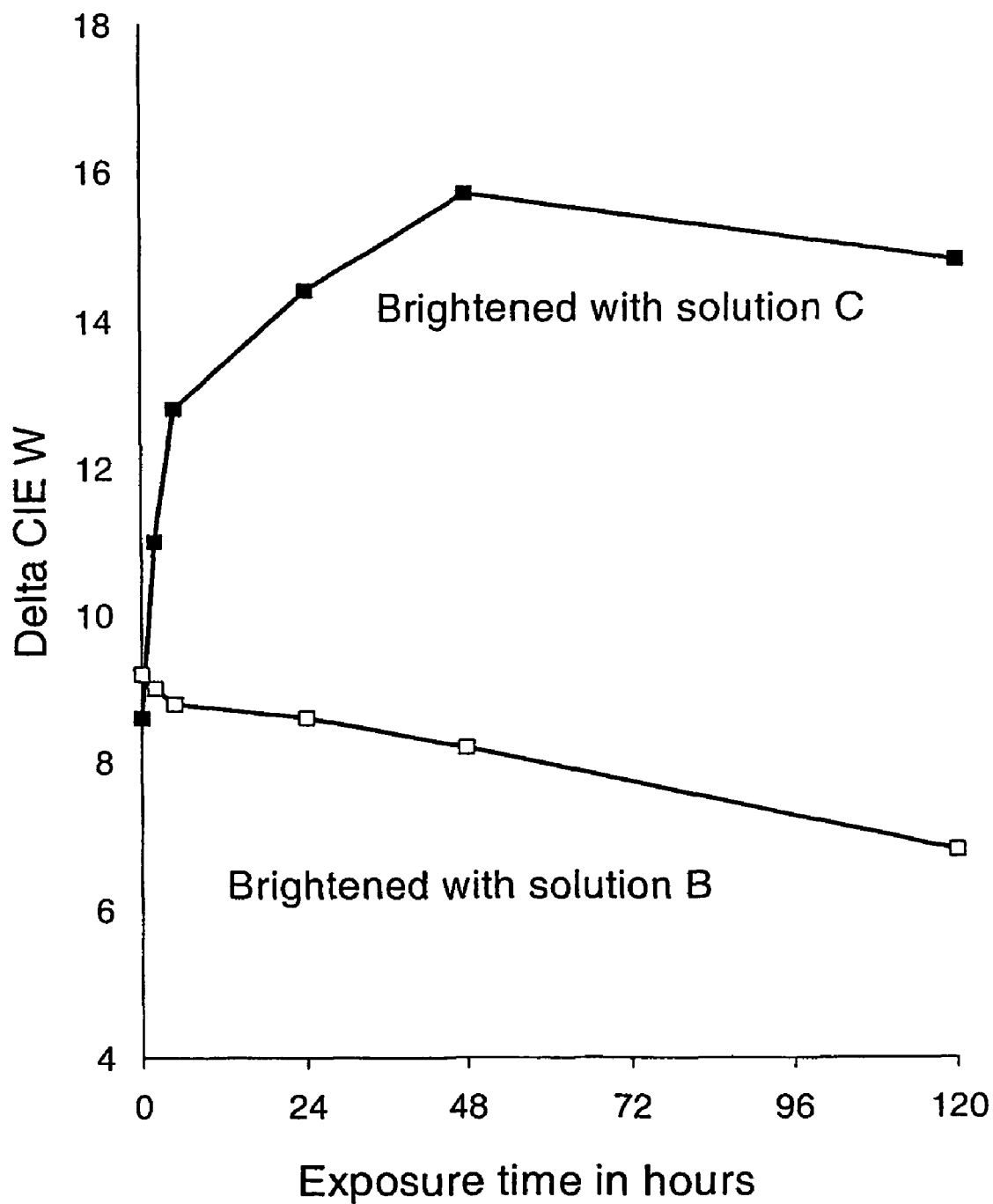

Accelerated ageing experiments are conducted by exposing the papers to direct sunlight. CIE whiteness measurements are made at regular intervals. The results are shown below in tabular (Table 2) and graphical (FIG. 2) forms.

TABLE 2

| | Time (h) | CIE W[1] | Delta CIE W[2] |
|---|---|---|---|
| Unbrightened base paper | 0 | 94.1 | — |
| | 2 | 88.1 | — |
| | 5 | 86.9 | — |
| | 24 | 85.8 | — |
| | 48 | 84.2 | — |
| | 120 | 80.1 | — |
| Brightened with SOLUTION B | 0 | 103.3 | 9.2 |
| | 2 | 97.1 | 9.0 |
| | 5 | 95.7 | 8.8 |
| | 24 | 94.4 | 8.6 |
| | 48 | 92.4 | 8.2 |
| | 120 | 86.9 | 6.8 |
| Brightened with SOLUTION C | 0 | 102.7 | 8.6 |
| | 2 | 99.1 | 11.0 |
| | 5 | 99.7 | 12.8 |
| | 24 | 100.2 | 14.4 |
| | 48 | 99.9 | 15.7 |
| | 120 | 94.9 | 14.8 |

APPLICATION EXAMPLE 3

SOLUTION D from Example 3 is added at a concentration of 1.2% by weight dry fiber to a stirred 2.5% aqueous suspension of a 50:50 mixture of bleached soft wood and hard wood pulps beaten to a freeness of 20–30° SR. After stirring for 5 minutes, the pulp suspension is diluted to 0.5% and a paper sheet is made by drawing 1 liter of the dispersed suspension through a wire mesh. After being pressed and dried, the brightened paper is measured for CIE Whiteness on a calibrated ELREPHO® spectrophotometer. For comparative purposes, a paper is prepared to approximately the same level of CIE whiteness using an aqueous SOLUTION E containing only brightener of formula (Vc).

Figure 3:
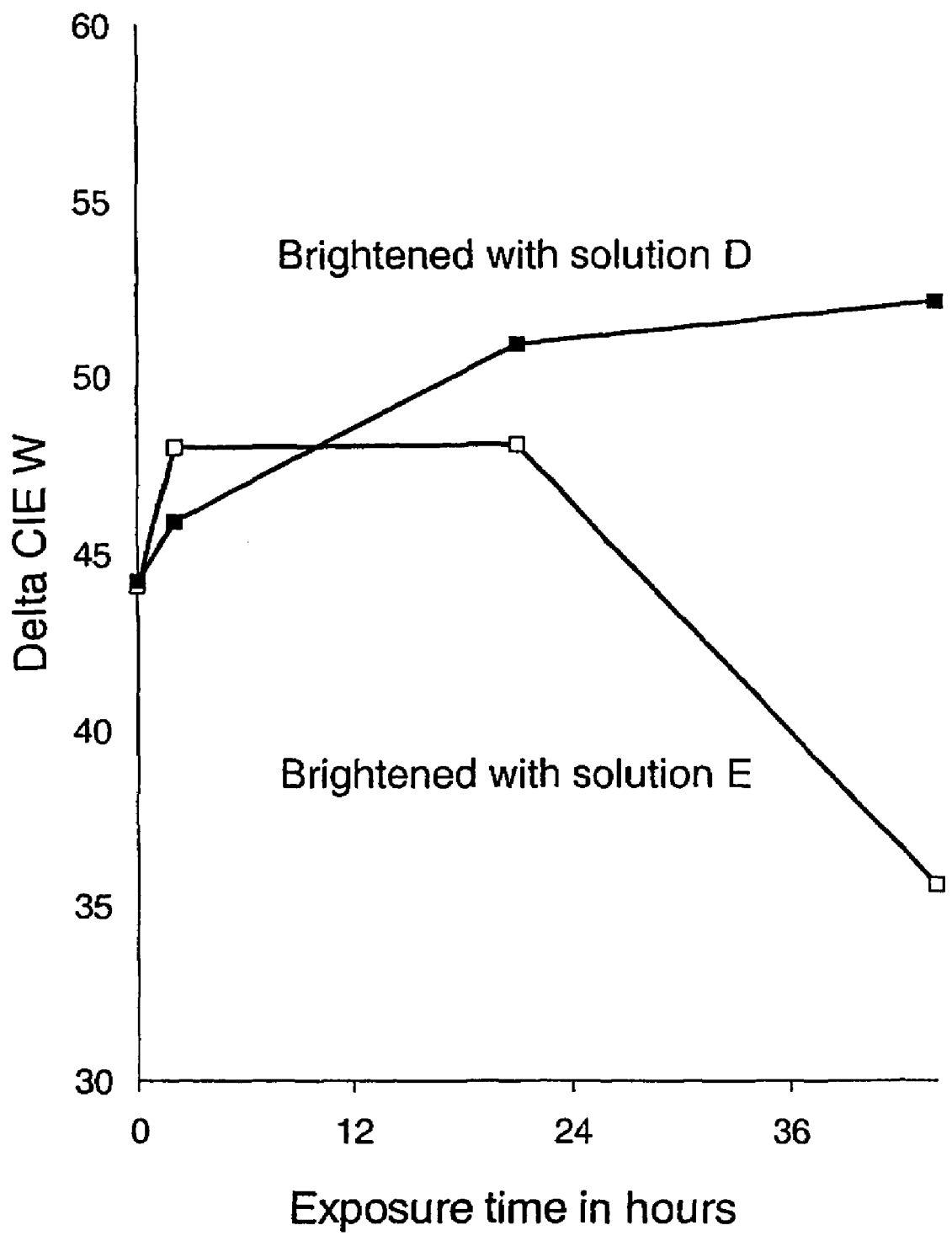

Accelerated ageing experiments are conducted by exposing the papers to direct sunlight. CIE whiteness measurements are made at regular intervals. The results are shown below in tabular (Table 3) and graphical (FIG. 3) forms.

TABLE 3

| | Time (h) | CIE W[1] | Delta CIE W[2] |
|---|---|---|---|
| Unbrightened base paper | 0 | 77.2 | — |
| | 2 | 79.8 | — |
| | 21 | 78.4 | — |
| | 44 | 76.3 | — |
| Brightened with SOLUTION E | 0 | 121.3 | 44.1 |
| | 2 | 127.8 | 48.0 |
| | 21 | 126.5 | 48.1 |
| | 44 | 111.9 | 35.6 |
| Brightened with SOLUTION D | 0 | 121.4 | 44.2 |
| | 2 | 125.7 | 45.9 |
| | 21 | 129.3 | 50.9 |
| | 44 | 128.4 | 52.1 |

APPLICATION EXAMPLE 4

A coating composition is prepared containing 500 parts chalk (Hydrocarb® 90), 500 parts clay (Kaolin® SPS), 494 parts water, 6 parts dispersing agent (Polysalz® S), 200 parts latex (Acronal® S320D) and 400 parts of a 20% solution of starch (Perfectamyl® A4692) in water. The solids content is adjusted to 66.7% by the addition of water, and the pH is adjusted to 8–9 with sodium hydroxide.

SOLUTION F from Example 4 is added at a concentration of 1.0% to the stirred coating composition. The brightened coating composition is then applied to a commercial 75 gm$^{-2}$ neutral-sized white paper base sheet using an automatic wire-wound bar applicator with a standard speed setting and a standard load on the bar. The coated paper is then dried for 5 minutes in a hot air flow. The dried paper is allowed to condition, then measured for CIE Whiteness on a calibrated ELREPHO® spectrophotometer. For comparative purposes, a coated paper is prepared to approximately the same level of CIE whiteness using an aqueous SOLUTION B containing only brightener of formula (IIIc).

Figure 4:
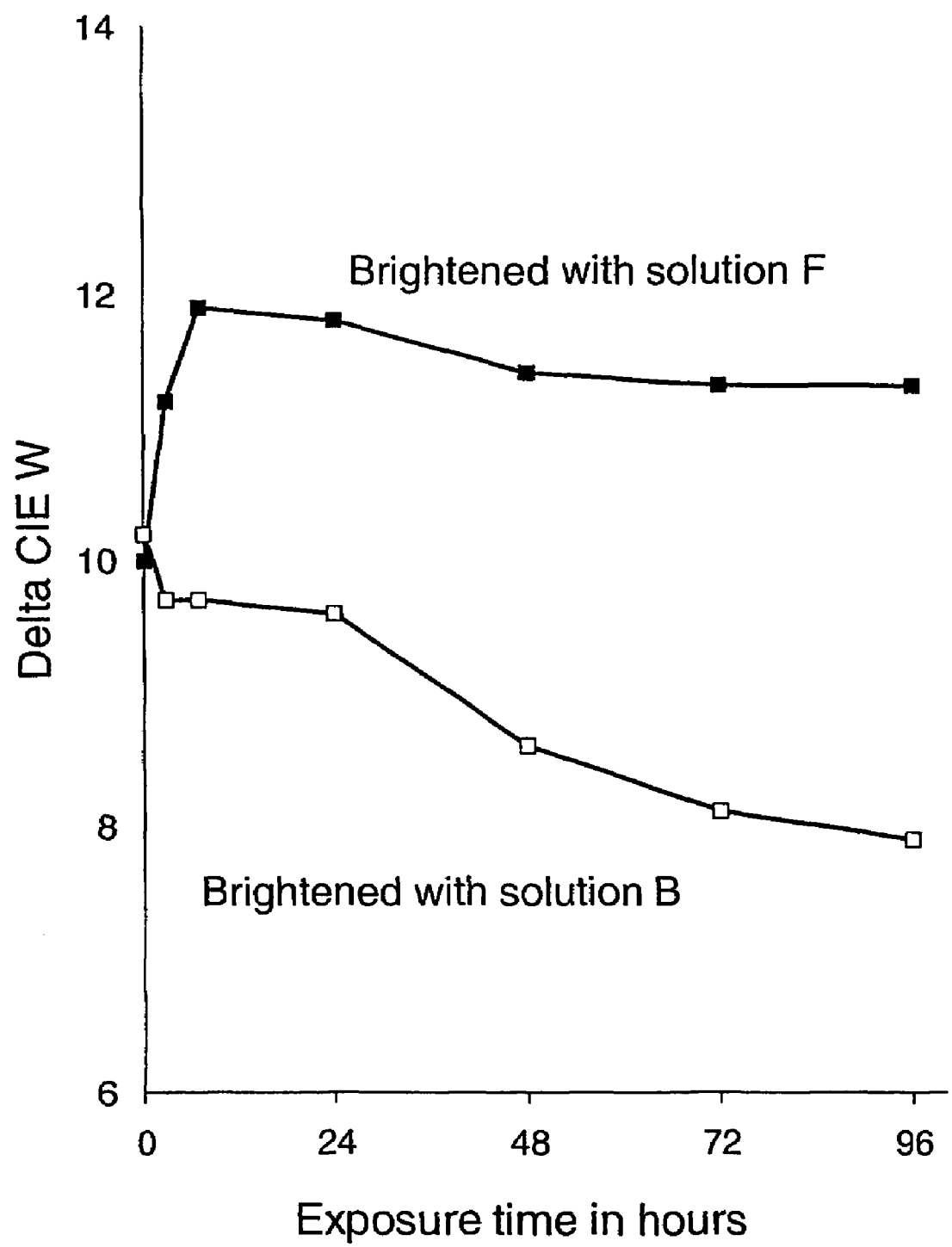

Accelerated ageing experiments are conducted by exposing the papers to direct sunlight. CIE whiteness measurements are made at regular intervals. The results are shown below in tabular (Table 4) and graphical (FIG. 4) forms.

TABLE 4

| | Time (h) | CIE W | Delta CIE W |
|---|---|---|---|
| Unbrightened base paper | 0 | 94.0 | — |
| | 3 | 88.3 | — |
| | 7 | 87.4 | — |
| | 24 | 86.1 | — |
| | 48 | 85.1 | — |
| | 72 | 83.1 | — |
| | 96 | 82.1 | — |
| Brightened with SOLUTION B | 0 | 104.2 | 10.2 |
| | 3 | 98.0 | 9.7 |
| | 7 | 97.1 | 9.7 |
| | 24 | 95.7 | 9.6 |
| | 48 | 93.7 | 8.6 |
| | 72 | 91.2 | 8.1 |
| | 96 | 90.0 | 7.9 |
| Brightened with SOLUTION F | 0 | 104.0 | 10.0 |
| | 3 | 99.5 | 11.2 |
| | 7 | 99.3 | 11.9 |
| | 24 | 97.9 | 11.8 |
| | 48 | 96.5 | 11.4 |
| | 72 | 94.4 | 11.3 |
| | 96 | 93.4 | 11.3 |

APPLICATION EXAMPLE 5

SOLUTION F from Example 4 is added at a concentration of 30 g/l to a stirred aqueous solution of an anionic oxidized potato starch (Perfectamyl® A4692) at 60° C. The solution is diluted with water to a starch concentration of 5%, and allowed to cool. The sizing solution is poured between the moving rollers of a laboratory size-press and applied to a commercial 75 gsm neutral-sized white paper base sheet. The treated paper is dried for 5 minutes at 70° C. in a flat bed drier. The dried paper is allowed to condition, then measured for CIE Whiteness on a calibrated ELREPHO® spectrophotometer. For comparative purposes, a paper is prepared to approximately the same level of CIE whiteness using an aqueous SOLUTION B containing only brightener of formula (IIIc).

Figure 5:
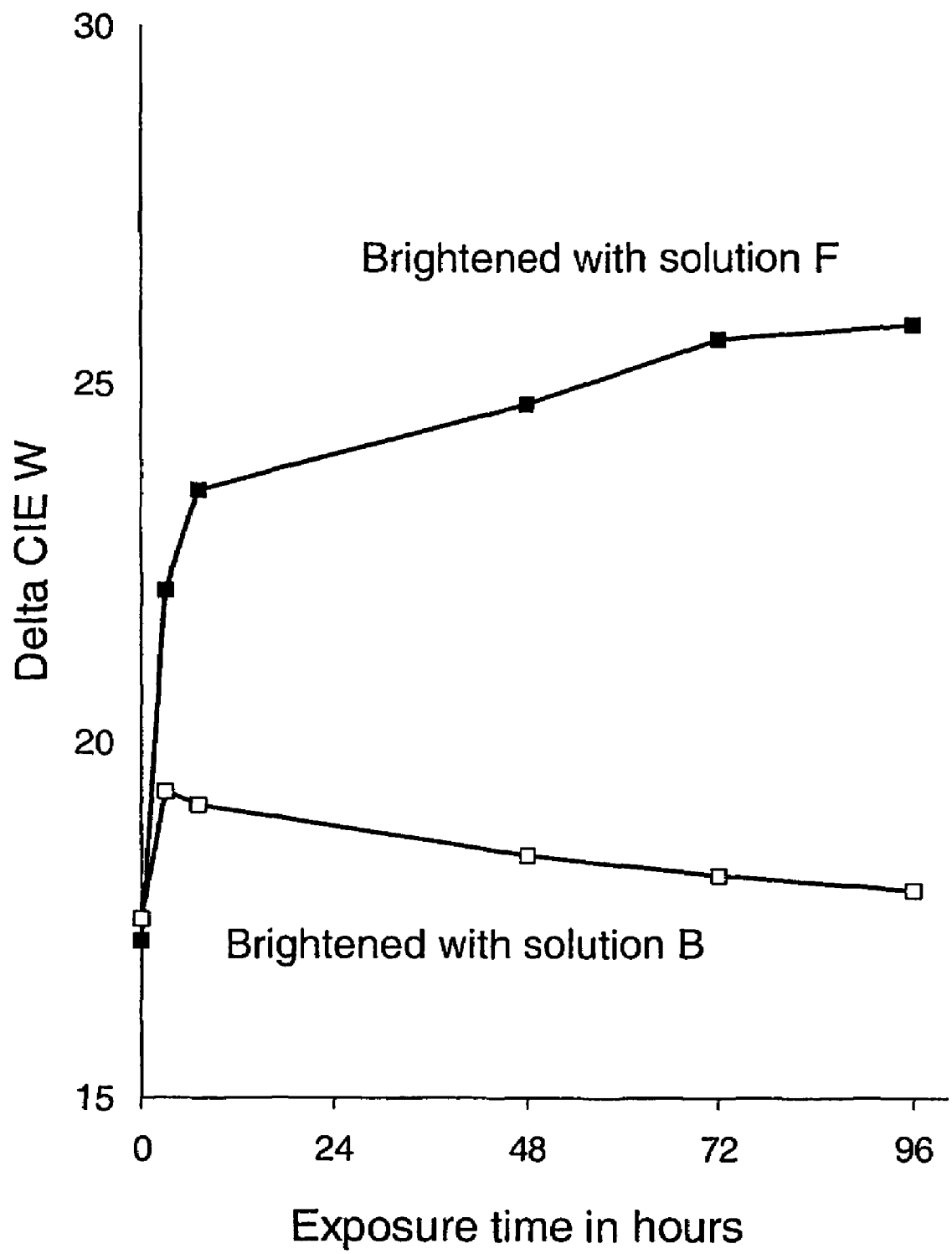

Accelerated ageing experiments are conducted by exposing the papers to direct sunlight. CIE whiteness measurements are made at regular intervals. The results are shown below in tabular (Table 5) and graphical (FIG. 5) forms.

TABLE 5

| | Time (h) | CIE W | Delta CIE W |
|---|---|---|---|
| Unbrightened base paper | 0 | 98.2 | — |
| | 3 | 95.6 | — |
| | 7 | 94.7 | — |
| | 48 | 90.3 | — |
| | 72 | 87.7 | — |
| | 96 | 85.7 | — |

TABLE 5-continued

| | Time (h) | CIE W | Delta CIE W |
|---|---|---|---|
| Brightened with SOLUTION B | 0 | 115.7 | 17.5 |
| | 3 | 114.9 | 19.3 |
| | 7 | 113.8 | 19.1 |
| | 48 | 108.7 | 18.4 |
| | 72 | 105.8 | 18.1 |
| | 96 | 103.6 | 17.9 |
| Brightened with SOLUTION F | 0 | 115.4 | 17.2 |
| | 3 | 117.7 | 22.1 |
| | 7 | 118.2 | 23.5 |
| | 48 | 115 | 24.7 |
| | 72 | 113.3 | 25.6 |
| | 96 | 111.5 | 25.8 |

APPLICATION EXAMPLE 6

A coating composition is prepared containing 500 parts chalk (Hydrocarb® 90), 500 parts clay (Kaolin® SPS), 494 parts water, 6 parts dispersing agent (Polysalz® S), 200 parts latex (Acronal® S320D) and 400 parts of a 20% solution of starch (Perfectamyl® A4692) in water. The solids content is adjusted to 66.7% by the addition of water, and the pH is adjusted to 8–9 with sodium hydroxide.

SOLUTION F from Example 4 is added at a concentration of 1.5% to the stirred coating composition. The brightened coating composition is then applied to a commercial 75 gm$^{-2}$ neutral-sized white paper base sheet using an automatic wire-wound bar applicator with a standard speed setting and a standard load on the bar. The coated paper is then dried for 5 minutes in a hot air flow. The dried paper is allowed to condition, then measured for CIE Whiteness on a calibrated ELREPHO® spectrophotometer. For comparative purposes, a coated paper is prepared to approximately the same level of CIE whiteness using an aqueous SOLUTION B containing only brightener of formula (IIIc).

Figure 6:
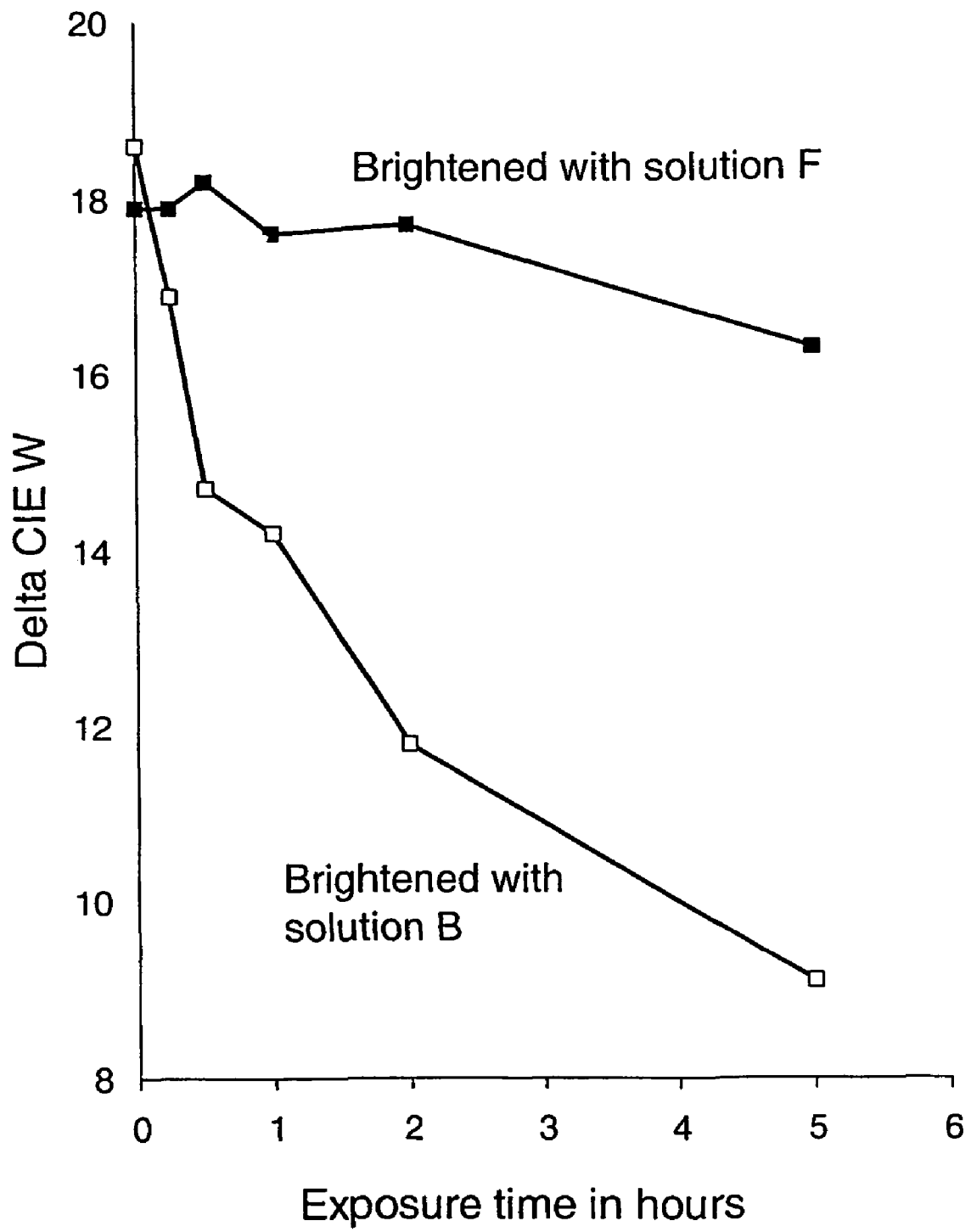

Accelerated ageing experiments are conducted by exposing the papers in a MEGASOL Xenon Arc Lightfastness Tester. CIE whiteness measurements are made at regular intervals. The results are shown below in tabular (Table 6) and graphical (FIG. 6) forms.

TABLE 6

| | Time (h) | CIE W | Delta CIE W |
|---|---|---|---|
| Unbrightened base paper | 0 | 82.3 | — |
| | 0.25 | 81.9 | — |
| | 0.5 | 81.4 | — |
| | 1.0 | 79.0 | — |
| | 2.0 | 76.2 | — |
| | 5.0 | 70.0 | — |
| Brightened with SOLUTION B | 0 | 100.9 | 18.6 |
| | 0.25 | 98.8 | 16.9 |
| | 0.5 | 96.1 | 14.7 |
| | 1.0 | 93.2 | 14.2 |
| | 2.0 | 88.0 | 11.8 |
| | 5.0 | 79.1 | 9.1 |
| Brightened with SOLUTION F | 0 | 100.2 | 17.9 |
| | 0.25 | 99.8 | 17.9 |
| | 0.5 | 99.6 | 18.2 |
| | 1.0 | 96.6 | 17.6 |
| | 2.0 | 93.9 | 17.7 |
| | 5.0 | 86.3 | 16.3 |

The invention claimed is:

1. A process for optically brightening a material, comprising the step of adding to the material a mixture, comprising compounds formula (I)

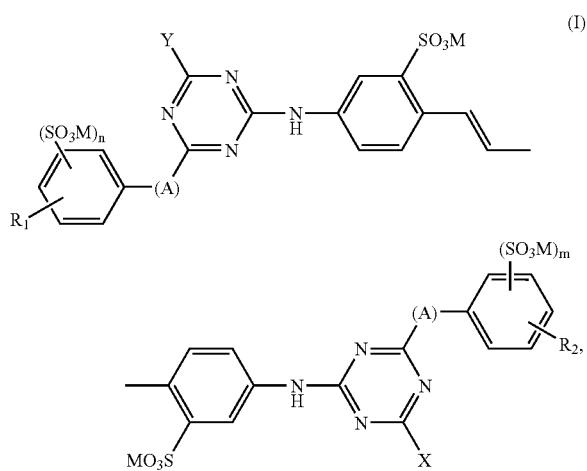

wherein

R$_1$ and R$_2$ are independently from each other H; halogen; unsubstituted C$_{1-6}$alkyl; substituted C$_{1-6}$alkyl or C$_{1-6}$alkoxy, each (A) is independently from each other —O— or —NR$_3$—, wherein R$_3$ is H; unsubstituted C$_{1-4}$alkyl or substituted C$_{1-4}$alkyl, X is halogen; OR$_4$; SR$_4$ or NR$_4$R$_5$, Y is halogen; OR$_4$; SR$_4$ or NR$_4$R$_5$, wherein R$_4$ is unsubstituted C$_{1-6}$alkyl; substituted C$_{1-6}$alkyl; unsubstituted phenyl or substituted phenyl, R$_5$ is H; unsubstituted C$_{1-6}$alkyl or substituted C$_{1-6}$alkyl, or R$_4$ and R$_5$ together with the nitrogen atom to which they are bonded form a pyrrolidinyl, piperidinyl or morpholinyl radical, n and m are independently from each other 0, 1 or 2 each M is a cation.

2. The process according to claim 1 wherein

R$_1$ and R$_2$ are independently from each other H; Cl; F; unsubstituted C$_{1-2}$alkyl; substituted C$_{1-2}$alkyl or C$_{1-2}$alkoxy, each (A) is independently from each other —O— or —NR$_3$—, wherein R$_3$ is H; unsubstituted C$_{1-2}$alkyl or substituted C$_{1-2}$alkyl, X is F or Cl, Y is Cl; F; OR$_4$; SR$_4$ or NR$_4$R$_5$, wherein R$_4$ is unsubstituted C$_{1-6}$alkyl; substituted C$_{1-6}$alkyl; unsubstituted phenyl or substituted phenyl, R$_5$ is H; unsubstituted C$_{1-6}$alkyl or substituted C$_{1-6}$alkyl, or R$_4$ and R$_5$ together with the nitrogen atom to which they are bonded form a pyrrolidinyl, piperidinyl or morpholinyl radical, n and m are independently torn each other 0, 1 or 2 each M is a cation.

3. The process according to claim 1 wherein the mixture further comprises at least one compound of formula (II)

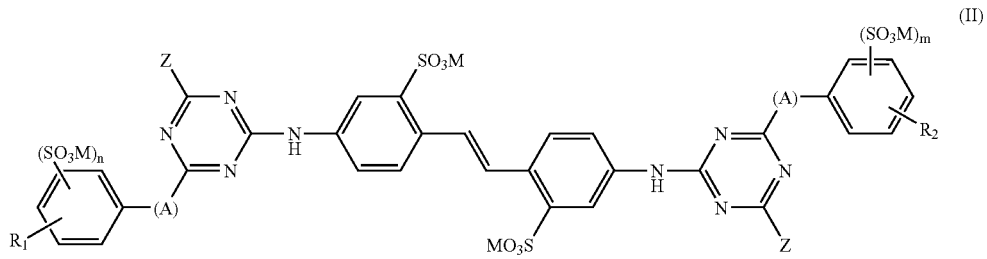

wherein $R_1$, $R_2$, (A), m, n and M have the same meanings as defined above and Z is $OR_4$, $SR_4$ or $NR_4R_5$, wherein $R_4$ and $R_5$ have the same meanings as defined above.

4. The process according to claim 3 wherein the at least one optical brightener further comprises about from 2-wt % to 95-wt % of the compound of formula (I), and 98-wt % to 5-wt % of the compound of formula (II).

5. The process according to claim 3 wherein the at least one optical brightener further comprises about from 5-wt % to 80-wt % of the compound of formula (I) and 95-wt % to 20-wt % of the compound of formula (II).

6. The process according to claim 1 wherein the material is selected from the group consisting of natural and regenerated cellulosic-fibers, natural and synthetic polyamide and polyurethane fibers, textiles and paper.

7. The process according to claim 1 wherein the material is paper.

8. A mixture comprising of two or more optical brighteners according to formula (I)

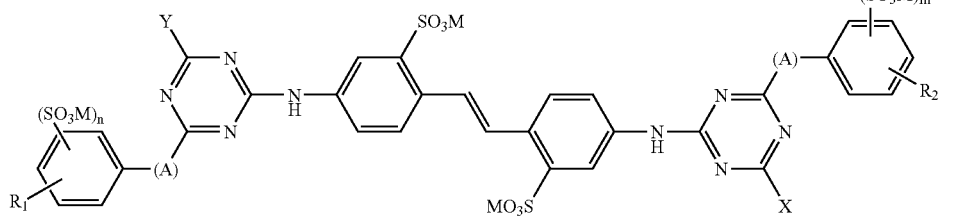

wherein $R_1$ and $R_2$ are independently from each other H; halogen; unsubstituted $C_{1-6}$alkyl; substituted $C_{1-6}$alkyl or $C_{1-6}$alkoxy, each (A) is independently from each other —O— or —$NR_3$—, wherein
  $R_3$ is H; unsubstituted $C_{1-4}$alkyl or substituted $C_{1-4}$alkyl,
X is halogen; $OR_4$; $SR_4$ or $NR_4R_5$,
Y is halogen; $OR_4$; $SR_4$ or $NR_4R_5$, wherein
  $R_4$ is unsubstituted $C_{1-6}$alkyl; substituted $C_{1-6}$alkyl, unsubstituted phenyl or substituted phenyl,
  $R_5$ is H: unsubstituted $C_{1-6}$alkyl or substituted $C_{1-6}$alkyl, or
  $R_4$ and $R_5$ together with the nitrogen atom to which they are bonded form a pyrrolidinyl, piperidinyl or morpholinyl radical,
n and m are independently from each other 0, 1 or 2
each M is a cation.

9. The process of claim 1, wherein X is F or Cl.

10. The process of claim 1, wherein the adding step further comprises at least one of incorporating the mixture into the material during formation of the material, fixing the mixture onto the material, or coating the mixture onto the material.

11. The optical brightener as claimed in claim 8, further comprising at least one compound of formula (II)

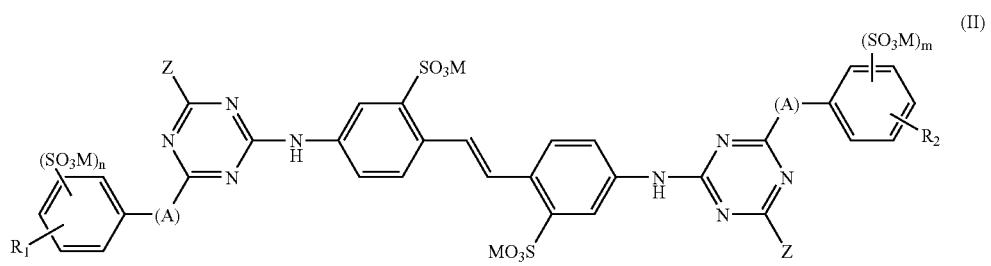

wherein $R_1$, $R_2$, (A), m, n and M have the same meanings as defined above and Z is $OR_4$, $SR_4$ or $NR_4R_5$, wherein $R_4$ and $R_5$ have the same meanings as defined above.

12. A material optically brightened by the process of claim 1.

13. The material as claimed in claim 12, wherein the material is selected from the group consisting of natural and regenerated cellulosic fibers, natural and synthetic polyamide and polyurethane fibers, textiles and paper.

* * * * *